Sept. 23, 1969      M. J. WRIGHT      3,469,167
BATTERY CHARGING SYSTEM FOR ROAD VEHICLES
Filed Nov. 28, 1966

United States Patent Office 3,469,167
Patented Sept. 23, 1969

3,469,167
BATTERY CHARGING SYSTEM FOR ROAD VEHICLES
Maurice James Wright, Birmingham, England, assignor to Joseph Lucas (Industries) Limited, Birmingham, England, a British company
Filed Nov. 28, 1966, Ser. No. 597,464
Claims priority, application Great Britain, Jan. 28, 1966, 3,880/66
Int. Cl. H02j 7/04
U.S. Cl. 320—48        7 Claims

ABSTRACT OF THE DISCLOSURE

In a battery charging system for a road vehicle the output of a generator is controlled by a voltage regulator. The voltage sensing part of the voltage regulator is arranged to be connected directly across the battery terminals when the generator is charging the battery, but when the generator is not charging the battery it is connected across the battery terminals in series with a diode and the ignition switch.

---

This invention relates to battery charging system for road vehicles.

A system according to the invention includes a pair of terminals between which in use the battery is connected, a voltage regulator for controlling the output of a generator which in use charges the battery, an ignition switch, and means whereby at least the voltage sensing part of the voltage regulator is connected directly across the battery terminals when the generator is charging the battery, but when the generator is not charging the battery is connected across the battery terminals in series with a diode and said ignition switch.

Figure 1:
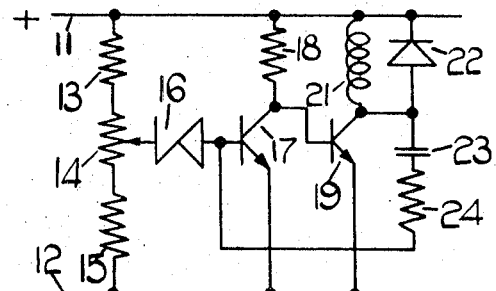
Figure 2:
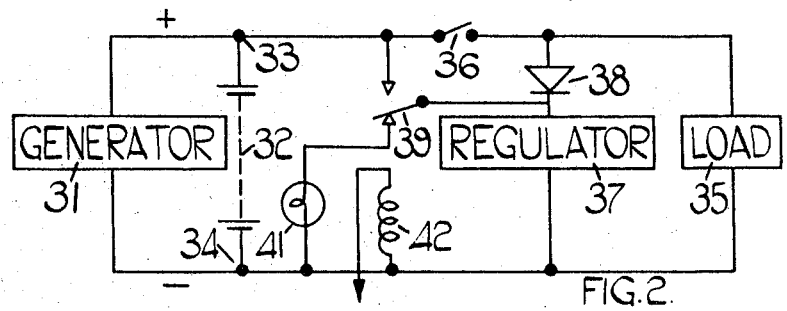
Figure 3:
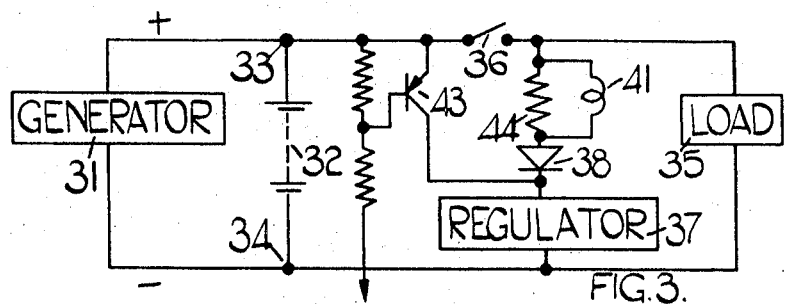
Figure 4:
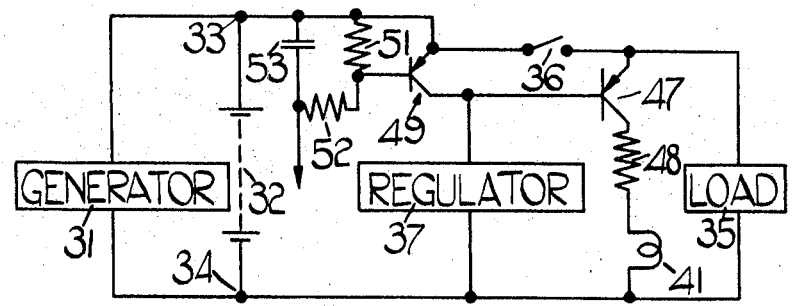

In the accompanying drawings, FIGURE 1 is a circuit diagram illustrating a known voltage regulator which can be employed in the present invention, and FIGURES 2 to 4 are circuit diagrams illustrating three examples of the invention.

Referring to FIGURE 1, a battery supplies power to positive and negative lines 11, 12 and is itself charged by a generator, which may be a dynamo and associated cut-out, or an alternator and associated full wave rectifier. Connected between the lines 11, 12 is a potentiometer chain 13, 14, 15, a variable point on the resistor 14 being connected through a Zener diode 16 to the base of an n-p-n transistor 17, the emitter of which is connected to the line 12 and the collector of which is connected to the line 11 through a resistor 18. The collector of the transistor 17 is further connected to the base of an n-p-n transistor 19, the emitter of which is connected to the line 12, and the collector of which is connected to the line 11 through the field winding 21 of the generator, the winding 21 being bridged by a diode 22 for conducting back E.M.F. The collector of the transistor 19 is further connected to the base of the transistor 17 through a capacitor 23 and resistor 24 in series.

In operation, when the voltage between the lines 11, 12 is below a predetermined value, the Zener diode 16 does not conduct, and the transistor 19 is bottomed by current flow through the resistor 18, so that field current flows in the winding 21. When the predetermined voltage is reached, the Zener diode 16 conducts, so providing base current to the transistor 17, which conducts to remove base current from the transistor 19. As the voltage rises further, a state is reached in which the transistor 17 is bottomed and the transistor 19 is off, and by virtue of the feed back components 23, 24 the circuit oscillates between the two stable states in which the transistors 17 and 19 are bottomed respectively. The relative periods of conduction of the transistors 17, 19 are determined by the current flowing through the Zener diode 16 and the arrangement is such that the mean current flow in the field winding 21 is adjusted to maintain the voltage between the lines 11, 12 substantially constant.

It will of course be appreciated that a voltage regulator shown in FIGURE 1 can be designed for use with p-n-p transistors, and with minor modifications is suitable for positive or negative earth system. Moreover, the invention can of course be used with a variety of other voltage regulators.

Referring now to FIGURE 2, there is provided a generator 31 which charges a battery 32 connected between battery terminals 33, 34. The terminal 34 is connected to one side of the ignition controlled loads 35 of a vehicle, the other side of the loads 35 being connected to the terminal 33 through the ignition switch 36 of the vehicle. The voltage regulator 37 for controlling the output of the generator 31 has one side connected to the terminal 34, and its other side connected to the cathode of a diode 38, the anode of which is connected to the terminal 33 through the switch 36. A point intermediate the regulator 37 and diode 38 is further connected to a relay contact 39 which, when the relay is de-energised, completes a circuit through a warning lamp 41 to the terminal 34, but when the relay is energised completes a circuit to the terminal 33. The relay coil 42 has one end connected to the terminal 34, and its other end associated with the generator so that the relay is energised when the generator is charging the battery. Assuming that the generator is an alternator and associated full wave rectifier, the other end of the coil 42 could conveniently be connected to the phase point of a delta connected alternator, or to the star point of a star-connected alternator.

In use, when the ignition switch 36 is closed, the warning lamp 41 is illuminated by current flowing through the diode 38 and contact 39, and at the same time current flows to the voltage regulator 37, which energises the field winding 21. When the generator is charging the battery, the regulator 37 operates as previously described with reference to FIGURE 1, and at the same time the relay is energised to move the relay contact 39 to its alternative position, so that the warning lamp 41 is extinguished, and the regulator 37 is connected directly across the battery. Thus, the regulator will be accurately sensitive to battery voltage, and errors will not arise as a result of the ignition switch 36. When the ignition switch 36 is opened, the generator will, of course stop charging the battery and so the relay 42 will be de-energised, causing the contact 39 to break the circuit to the regulator 37.

In certain circumstances, the voltage across the ignition circuit can reverse, and the diode 38 prevents damage to the regulator by any such reversal in voltage. Moreover, it is sometimes possible in systems of this kind for the ignition switch 36 to become by-passed when the warning lamp is not in operation, and the diode 38 prevents this possibility. It will be appreciated that because of the characteristic of a diode, the voltage across the diode 38 when the ignition switch 36 is closed will be very small, and so the regulator 37 will be subjected substantially to the voltage between the terminals 33, 34 less the voltage drop across the switch 36.

It is not necessary for the entire regulator 37 to be connected in series with the diode 38, and parts of the regulator can be connected directly or by way of the switch 36, to the terminal 33, depending on the particular type of regulator used. Considering the specific regulator shown in FIGURE 1, the voltage sensing network including the potentiometer chain 13, 14, 15 is connected to the terminal 33 through the switch 36 to avoid wastage of power when the ignition switch 36 is open. However, the winding 21 and associated diode 22 can be connected directly to the terminal 33, but in this case the resistor 18 must be connected to the terminal 33 through the diode 38, or otherwise the transistor 19 would conduct when the switch 36 is open.

In FIGURE 3, the relay contact 39 and associated relay are not used, and are replaced by p-n-p transistor 43 having its collector connected to the point intermediate the diode 38 and regulator 37, its emitter connected to the terminal 33, and its base connected to a point intermediate a pair of resistors connected between the terminal 33 and the generator, the connection being made in the same way as the connection to the coil 42, and smoothing components being added if necessary. In this case, the transistor 43 conducts only when the generator is charging the battery, and so the operation of this part of the circuit is substantially the same as in FIGURE 2. However, the warning lamp 41 cannot now be connected in the same position, and so it is connected between the anode of the diode 38 and the ignition switch 36. Preferably, the warning lamp 41 is now bridged by a resistor 44 which ensures that sufficient field current flows when the ignition switch 36 is closed. The warning lamp 41 is extinguished when the transistor 43 is bottomed, since the lamp and diode are virtually short circuited by the transistor 43.

Referring now to FIGURE 4, the regulator has one side connected to the terminal 34, and its other side connected to the base of a p-n-p transistor 47, the emitter of which is connected to the terminal 33 through the ignition switch 36, and the collector of which is connected to the terminal 34 through a resistor 48 and the warning lamp 41 in series. A point intermediate the regulator 37 and transistor 47 is connected to the collector of a further transistor 49, the emitter of which is connected to the terminal 33, and the base of which is connected to the terminal 33 through a resistor 51 in parallel with the series circuit including a resistor 52 and a capacitor 53. A point intermediate the resistor 52 and capacitor 53 is connected via a resistor to the generator in the same way as the coil 42 in FIGURE 2. In this example, the base-emitter diode of the transistor 47 serves precisely the same function as the diode 38 in FIGURE 2 and FIGURE 3, the transistor 49 serves same function as the transistor 43 in FIGURE 3, the components associated with the base of the transistor 49 serving to smooth the signal obtained from the alternator. Thus, when the ignition switch 36 is closed, current flows through the emitter and base of the regulator 37, and this current also renders the transistor 47 conductive so that the warning lamp 41 is illuminated. When the generator is charging the battery, the transistor 49 conducts to connect the regulator 37 directly across the battery terminals, and at the same time to remove the base current from the transistor 47, which is therefore switched off so that the lamp 41 is extinguished.

The invention can also be applied to a standard electromechanical regulator in which a coil senses the output voltage and contacts operated by the coil are connected in series with the ignition switch and field winding and control the mean current flow in the field winding. The arrangement is similar to FIGURE 2 where the voltage sensing coil is connected in place of regulator 37 and the contacts and field winding are in parallel with the load 35.

In all the circuits described, protective components may in some instances be required to ensure that in the event of the voltage across any part of the circuit reversing as a result of a transient, no damage is caused. In its simplest form, such protection could be provided by a capacitor across that part of the circuit, but preferably a diode is connected across the circuit to conduct any such transients. The diode can be a simple diode or a Zener diode, and in the latter case the diode has the additional advantage that if the breakdown voltage is chosen to be above the normal working voltage, protection is afforded against both positive and negative transients.

The invention can also be applied to diesel engined vehicles, where a switch is provided which performs a similar function to the ignition switch in controlling current flow to various loads, although of course there is no ignition circuit. The switch on a diesel engined vehicle is commonly termed the ignition switch, and so this terminology is used throughout this specification.

Having thus described my invention what I claim as new and desire to secure by Letters Patent is:

1. A battery charging system for a road vehicle, including a pair of terminals between which in use the battery is connected, a voltage regulator for controlling the output of a generator which in use charges the battery, an ignition switch, and means whereby at least the voltage sensing part of the voltage regulator is connected directly across the battery terminals when the generator is charging the battery, but when the generator is not charging the battery is connected across the battery terminals in series with a diode and said ignition switch.

2. A system as claimed in claim 1 in which said means includes a switch controlled by the generator and serving to short-circuit the series connection of the ignition switch and diode when the generator is producing an output.

3. A system as claimed in claim 2 in which the generator-controlled switch is a transistor the base current of which is controlled by the generator.

4. A system as claimed in claim 2 in which the generator-controlled switch is the contact of a relay, the coil of which is energised under the control of the generator.

5. A system as claimed in claim 2 in which the generator-controlled switch serves when the generator is not producing an output to complete a circuit to a warning lamp by way of the ignition switch and diode.

6. A system as claimed in claim 2 in which said series connection includes a warning lamp which is illuminated until the generator produces an output.

7. A system as claimed in claim 2 in which the diode is constituted by the base-emitter path of a transistor having a warning lamp in its collector circuit.

References Cited

UNITED STATES PATENTS

| | | | |
|---|---|---|---|
| 3,041,525 | 6/1962 | Shimwell et al. | 322—73 X |
| 3,210,645 | 10/1965 | Domann | 322—28 |
| 3,231,811 | 1/1966 | Peras | 320—61 X |
| 3,293,536 | 12/1966 | Byles | 320—64 X |
| 3,343,070 | 9/1967 | Frysztak | 322—73 X |

JOHN F. COUCH, Primary Examiner

STANLEY WEINBERG, Assistant Examiner

U.S. Cl. X.R.

123—148; 315—171; 320—61; 322—28, 99